March 18, 1941.　　　J. J. BAUMAN　　　2,235,792
UTENSIL HANDLE
Filed April 10, 1939
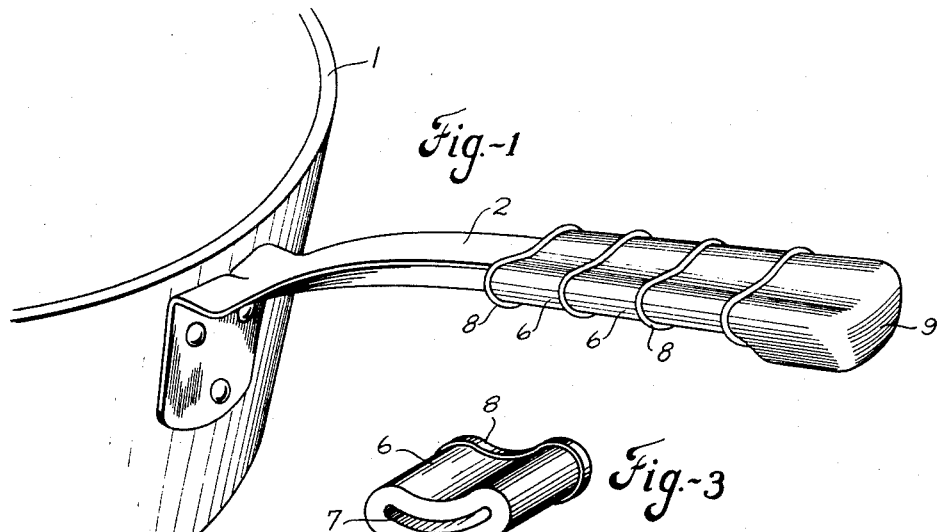
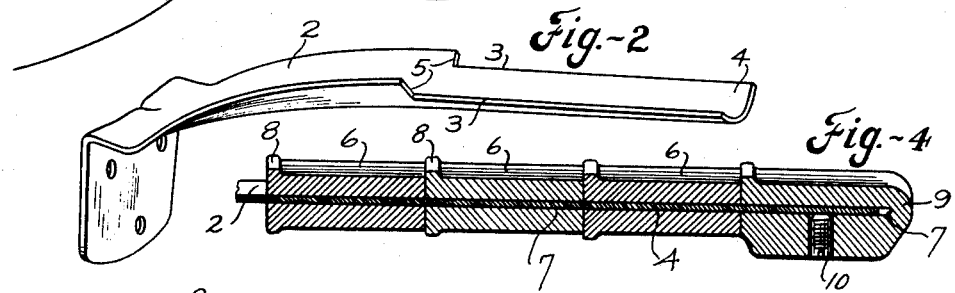
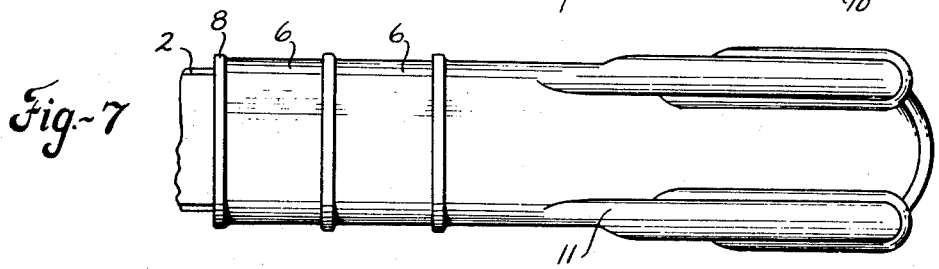
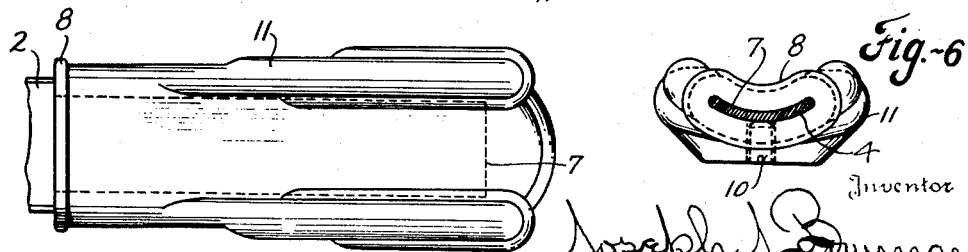

Patented Mar. 18, 1941

2,235,792

UNITED STATES PATENT OFFICE 2,235,792

UTENSIL HANDLE

Joseph J. Bauman, Chicago, Ill., assignor to Kurz-Kasch, Inc., Dayton, Ohio, a corporation of Ohio Application April 10, 1939, Serial No. 267,030

2 Claims. (Cl. 16—116)

This invention pertains to handles for cooking utensils, and more particularly to a sectional thermally insulated handle of universal character.

It is highly desirable and more or less common practice to sheath the handles of cooking utensils with wood or other materials of low heat conductive character. While molded plastics of synthetic resinous or phenolic condensation materials are suitable and desirable for such purpose, the necessity of providing special molds for each different length or size of handle and certain difficulties of molding such handle units with longitudinal openings of considerable length to receive the handle shafts makes such handles economically prohibitive.

In the present invention there is contemplated the assembly on a metal handle shaft or core of a succession of relatively short interchangeable cored blocks or sections and a terminal finial or finish member which together may form a handle sheath of any desired length, suitable for large or small utensils. Thus one set of molds is made to suffice for handle sheaths of various sizes, and, due to the relative short length of the individual sections, molding difficulties are greatly minimized.

The object of the invention is to provide an improved thermally insulated handle for cooking utensils and the like, which may not only be economically manufactured, but will be more efficient in use, universally adaptable to utensil handles of different length, capable of being easily and rapidly assembled, and unlikely to become broken or displaced.

A further object of the invention is to provide an assembled handle sheath including multiple sections, which may be extended to any desired length.

A further object of the invention is to provide handle sheath sections which may be easily and economically molded from plastic material.

A further object of the invention is to provide a utensil handle of pleasing appearance and attractive design at relatively low cost.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, wherein is shown the preferred but obviously not necessarily the only form of embodiment of the present invention, Fig. 1 is a perspective view of a portion of a vessel having a sheathed handle embodying the present invention.

Fig. 2 is a perspective view of the metallic handle shaft or core upon which the present sectional handle sheath is to be assembled.

Fig. 3 is a perspective view of one of the premolded units or sections prior to assembly.

Fig. 4 is a longitudinal sectional view of a portion of a utensil handle and a protective sectional handle sheath assembled thereon.

Fig. 5 is a plan view of a modification wherein the terminal unit or section is of ample length to serve alone as a handle.

Fig. 6 is an end elevation thereof.

Fig. 7 is a top plan view of the handle shown in Fig. 5 assembled in conjunction with additional units or sections as shown in Fig. 3 to afford an extended sheath.

Like parts are indicated by similar characters of reference throughout the several views.

The present purpose is to provide an inexpensive handle sheath of molded plastic material. To this end there are employed a succession of separate preformed units or sections which may be combined into handle sheaths of different length. In event such stock units are molded in different designs, they may be assembled in various combinations to afford handle sheaths of different appearance.

Referring to the drawing, 1 is a vessel or cooking utensil having the usual metal handle shaft 2 of concavo-convex channeled form. Obviously the particular cross-sectional shape of the handle 2 is immaterial. That shown is quite conventional.

The portion of the handle shaft to be enclosed in a protective sheath is marginally reduced as at 3 in Fig. 2, leaving a tang 4 to receive the premolded sections and shoulders 5 against which the assembled handle sheath may abut.

For illustrative purpose, but with no intent to unduly limit the shape, appearance or design of the handle sheath, there are provided a plurality of relatively short tubular units or sections 6, preferably, although not necessarily, molded from plastic material. In the present instance the section or unit 6 is of concavo-convex form, having therethrough a transversely arcuate passage 7 having dimensions closely conforming to the tang 4 of the handle shaft. These sections may be plain, but to afford a better grip and to improve their appearance and conceal the abutting joints therebetween, the sections are preferably formed with peripheral beads 8 coincident with one end thereof.

A plurality of such tubular units or sections 6 are assembled on the handle tang 4, and as a finish and to afford a terminal enlargement enabling a more secure grasp there is assembled therewith a finial 9 of increased thickness, which gives the effect of a slight knob or enlargement to the terminal of the sheath. The terminal member 9 has a passage similar to the passage 7 and agreeing with the dimensions of the handle tang 4 extending partially, but not entirely, therethrough. The several sheath sections 6 being assembled in contact upon the tang 4 and closely conforming thereto, the finial section 9 is pressed thereon and the entire series is secured by a set screw 10 in the finial section 9, having engagement with the terminal portion of the handle tang 4.

If so desired, the finial or terminal section may be made sufficiently long to alone serve as a handle sheath for a relatively short handle as shown in Fig. 5, and when a longer handle is to be protected, one or more of the short sections 6 may be assembled on the handle shaft in advance of the elongated finial section as shown in Fig. 7. Thus one relatively short handle section may be made universally applicable to larger size handle shafts by association therewith of any desired number of supplemental premolded units or sections 6. However, such handle section as shown in Figs. 5 and 7 necessitates a much more expensive mold and is more difficult and expensive to mold, thereby increasing cost of production. The terminal section as shown in Figs. 5 and 7 has an enlargement 11 on its under side to provide a hand engaging abutment. For this reason the form of embodiment of the invention shown in Figs. 1 and 4 is preferred for competitive commercial exploitation. The shape, proportions and appearance of the sections or units and the order of their assembly if of varying shape may be varied at will.

From the above description it will be apparent that there is thus provided a device of the character described possessing the particular features of advantage before numerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

I claim:

1. A utensil handle including a handle member, of concavo-convex cross section, said member having each of the sides of its outer end portion cutaway to form a pair of transversely alined shoulders, a series of identical interchangeable sections and a terminal section, said sections having axial openings of concavo-convex cross section to conformably receive the cutaway portion of the handle member and mounted on the latter, the inner end of the innermost section abutting said shoulders throughout the entire length of the latter, the opening in the terminal section being closed at the outer end thereof, said terminal section having an enlargement on its under side to provide a hand engaging abutment, and a set screw extending through said enlargement for contacting the handle member to releasably hold said sections in position.

2. A utensil handle in accordance with claim 1, wherein one end of each of the sections has a transverse peripheral bead encircling same, whereby the beads conjointly form a roughened hand grip.

JOSEPH J. BAUMAN.